US007839788B2

(12) United States Patent
Qi

(10) Patent No.: US 7,839,788 B2
(45) Date of Patent: Nov. 23, 2010

(54) SYSTEMS AND METHODS FOR LOAD BALANCING STORAGE SYSTEM REQUESTS IN A MULTI-PATH ENVIRONMENT BASED ON TRANSFER SPEED OF THE MULTIPLE PATHS

(75) Inventor: Yanling Qi, Austin, TX (US)

(73) Assignee: LSI Corporation, Milpitas, CA (US)

( * ) Notice: Subject to any disclaimer, the term of this patent is extended or adjusted under 35 U.S.C. 154(b) by 243 days.

(21) Appl. No.: 12/122,898

(22) Filed: May 19, 2008

(65) Prior Publication Data
US 2009/0285098 A1 Nov. 19, 2009

(51) Int. Cl.
*H04L 12/26* (2006.01)
(52) U.S. Cl. ................. 370/235; 370/248; 710/316; 709/223
(58) Field of Classification Search ......... 370/229–240, 370/248, 250–258; 709/223–226; 710/316
See application file for complete search history.

(56) References Cited

U.S. PATENT DOCUMENTS

| | | | |
|---|---|---|---|
| 2004/0042489 A1* | 3/2004 | Messick et al. ............. 370/468 |
| 2006/0085595 A1* | 4/2006 | Slater ......................... 711/114 |
| 2007/0067537 A1* | 3/2007 | Seto ........................... 710/301 |
| 2007/0130344 A1* | 6/2007 | Pepper ....................... 709/227 |
| 2008/0222661 A1* | 9/2008 | Belyakov et al. ........... 719/321 |
| 2008/0250178 A1* | 10/2008 | Haustein et al. ............ 710/107 |
| 2009/0190493 A1* | 7/2009 | Nakata ........................ 370/253 |

* cited by examiner

*Primary Examiner*—Ricky Ngo
*Assistant Examiner*—Gary Mui
(74) *Attorney, Agent, or Firm*—Duft Bornsen & Fishman LLP

(57) ABSTRACT

Methods and systems for distributing I/O requests from a computer system to a storage system over multiple paths having non-homogeneous transfer speeds. A large I/O request is partitioned into a plurality of smaller I/O operations between a computer system and a storage system. The I/O operations are distributed over a plurality of communication paths coupling the computer system and the storage system. The distribution attempts to balance the load over the multiple paths based on the transfer speed of each path. In one embodiment, operations are distributed only to the highest speed paths presently operable. In another embodiment, an estimated completion time for an operation is determined for each path and a path with the lowest estimated completion time is selected to transfer the next operation.

15 Claims, 10 Drawing Sheets

SYSTEMS AND METHODS FOR LOAD BALANCING STORAGE SYSTEM REQUESTS IN A MULTI-PATH ENVIRONMENT BASED ON TRANSFER SPEED OF THE MULTIPLE PATHS

BACKGROUND

1. Field of the Invention

The invention relates generally to load balancing I/O operations transferred to a storage system from a computer over multiple paths and more specifically relates to load balancing the distribution of I/O operations from a computer system to a storage system over multiple communication paths based on the transfer speed of the communication paths.

2. Related Patents

This patent is related to commonly owned U.S. Pat. No. 7,093,265 entitled METHOD AND APPARATUS FOR PROVIDING HIGHLY-TRANSPARENT, HOST-BASED MULTI-PATHING SUPPORT which is hereby incorporated by reference.

3. Discussion of Related Art

Storage systems continue to grow ever larger and faster as applications for storage demand higher performance and capacity. In one aspect of enhancing performance and reliability, computer systems may be coupled to a storage system via multiple paths. A multi-path driver may be provided to address the problem of selecting from among multiple paths to a storage device for transfer of I/O operations therebetween. A multiple-path driver, such as LSI Corporation's Multiple-Path-Proxy (MPP) driver architecture, creates a virtual storage device (or virtual data path) for each storage volume and hides the physical storage devices and data paths from the operating system and application programs. The physical data access paths are only visible to the MPP driver and an appropriate administrator application. The rest of the operating system and applications see only the virtual data paths. Details of the MPP driver architecture are discussed in LSI Corporation's above identified, commonly owned, co-pending patent applications.

When an I/O request is directed to a virtual device defined by the MPP, the MPP driver selects a physical path to the storage device and routes the I/O operation(s) for the request to the selected physical path to complete the I/O request. If a selected physical data path fails or previously failed, the MPP driver may re-route I/O operations for the logical volume through any of the other available physical data paths.

In addition, the multiple paths may be used in parallel to queue I/O operations from one or more computers systems for processing by the storage system. Thus an I/O request from a computer system may be transferred over any of the available multiple paths. Use of multiple-paths between a host system and a storage device therefore improves both performance and reliability. Reliability is improved in that if a physical path fails, the host system (i.e., the MPP driver) may use other physical paths to access data. Performance is improved in that the host may perform I/O load balancing by distributing the I/O operations for one or more I/O requests through multiple physical paths. The operations may therefore be completed using parallel operation of multiple paths.

Presently known load balancing techniques applied to such a multi-path storage environment are simplistic. For example, a simple "round robin" load balancing approach to distribute requests over a plurality of identical paths is adequate since the paths are all identical. However, if the multiple paths are not homogenous in their transfer speeds or other performance metrics, the aggregate performance using such a simplistic round robin technique devolves to the performance of the path with the lowest performance since other operations to complete a request may have to await completion of an operation on the slower communication path(s).

Thus it is an ongoing challenge to distribute I/O operations from a computer system to a storage device over multiple paths where the paths are not homogenous with respect to performance metrics.

SUMMARY

The present invention solves the above and other problems, thereby advancing the state of the useful arts, by providing methods and systems for distributing I/O operations over multiple paths between a computer system and a storage system based on the transfer speed of the various paths so as to improve utilization of the available bandwidth.

In one aspect hereof, a method is provided in a system having a computer system coupled to a storage system through multiple communication paths where the communication paths have non-homogeneous data transfer speeds. The method provides load balancing of data transfer over the multiple communication paths between the computer system and the storage system. The method includes determining the transfer speed of each communication path and distributing exchanges between the computer system and the storage system over the multiple communication paths based on the transfer speed of each communication path.

Another aspect hereof provides a method operable in a computer system coupled to a storage system through multiple communication paths ($P_i$ where i=1 ... n). The communication paths have non-homogeneous data transfer speeds ($r_i$). The method provides load balancing of transmissions over the multiple communication paths from the computer system to the storage system. The method includes determining the present operability of each of the plurality of communication paths and determining the transfer speed ($r_i$) of each presently operable communication path. The method then estimates the completion time ($\Delta T_i$) for a transfer for each presently operable communication path $P_i$ based on the transfer speed thereof $r_i$. The method then distributes the transfer to one of the multiple communication paths having the lowest estimated completion time.

DETAILED DESCRIPTION OF THE DRAWINGS

Figure 1:
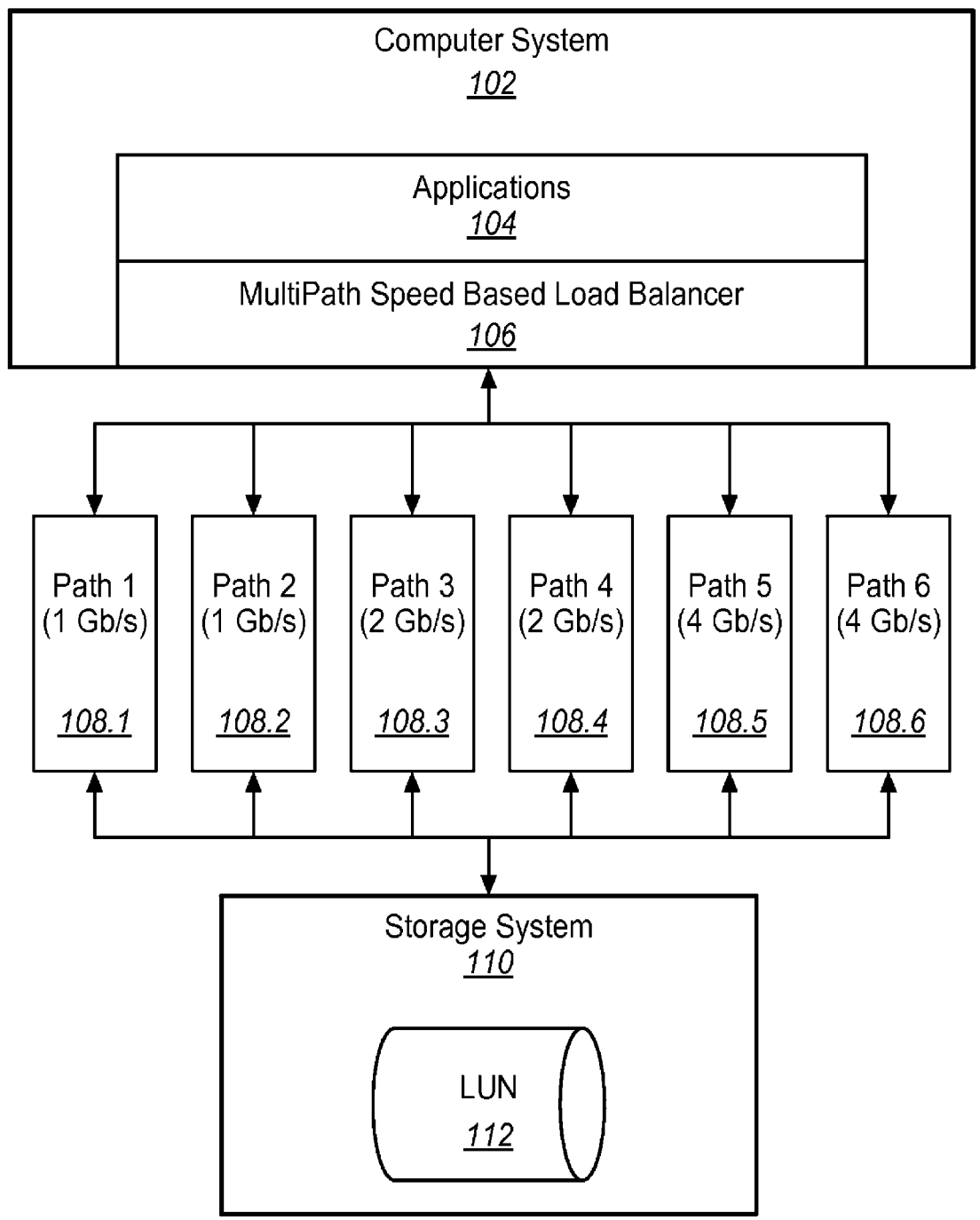
FIG. 1 is a block diagram of a system providing multi-path speed based load balancing in accordance with features and aspects hereof.

FIG. 1 is a block diagram of a system 100 enhanced in accordance with features and aspects hereof to include a multi-path speed based load balancer 106 for balancing the load of I/O operations transmitted between a computer system 102 and a storage system 110 via multiple paths 108.1 through 108.6. Though FIG. 1 shows six paths, any number of paths may be configured. Computer system 102 represents any suitable computing device including, for example, a personal computer, a workstation, a server computing node, or any other suitable computing device. Applications 104 are operable within computer system 102 and generate I/O requests that are broken into one or more I/O operations to access data stored in logical unit (LUN) 112 on storage system 110. Storage system 110 may be any suitable storage subsystem in which logical volumes such as logical unit 112 may be defined. In general, storage system 110 represents a variety of high reliability, high capacity storage subsystems such as RAID storage systems where a plurality of logical units (logical volumes) may be defined and distributed across a plurality of storage devices (e.g., disk drives).

Where as shown in FIG. 1 a computer system 102 is coupled to a storage system 110 through multiple paths 108.1 through 108.6, it is useful to provide a load balancing technique to allow distribution of I/O operations over multiple of the possible paths so that the I/O request may be efficiently transmitted from the computer system to the storage system. Where all of the multiple paths are homogeneous in terms of their performance (e.g., identical performance redundant paths), simple round robin load balancing techniques using all paths may be applied effectively. However, where as in system 100, the multiple paths provide different performance characteristics (i.e., non homogeneous communication paths), simple round robin load balancing techniques may be ineffective. The net throughput for distributing I/O operations essentially equally across all available paths generally results in the aggregated transfer of multiple operations being slowed to the performance of the slowest of the multiple communication paths. Thus, in accordance with features and aspect hereof, computer system 102 includes multi-path speed based load balancer 106 to balance the load distribution of I/O requests over the multiple paths based upon the performance (transfer speed) of the various paths.

As shown in FIG. 1, each path may have a different maximum transfer speed. Path 1 (108.1) and a path 2 (108.2) are shown as exemplary 1 Gb per second paths. Path 3 (108.3) and path 4 (108.4) are shown as 2 Gb per second paths while path 5 (108.5) and path 6 (108.6) shown as 4 Gb per second paths. Further, those of ordinary skill in the art will also recognize that each of the paths may use any of a variety of communication media and protocols including, for example, Serial Attached SCSI (SAS), Serial Advanced Technology Attachment (SATA), Fibre Channel, etc. Each of the paths may provide a different transfer speed based on the physical limitations of the particular media and protocol selected for coupling the computer system 102 to the storage system 110.

Multi-path speed based load balancer 106 gathers transfer speed of each of the available multiple paths. In one exemplary embodiment, load balancer 106 may interact with an administrator process to aid in gathering the transfer speeds.

Figure 2:
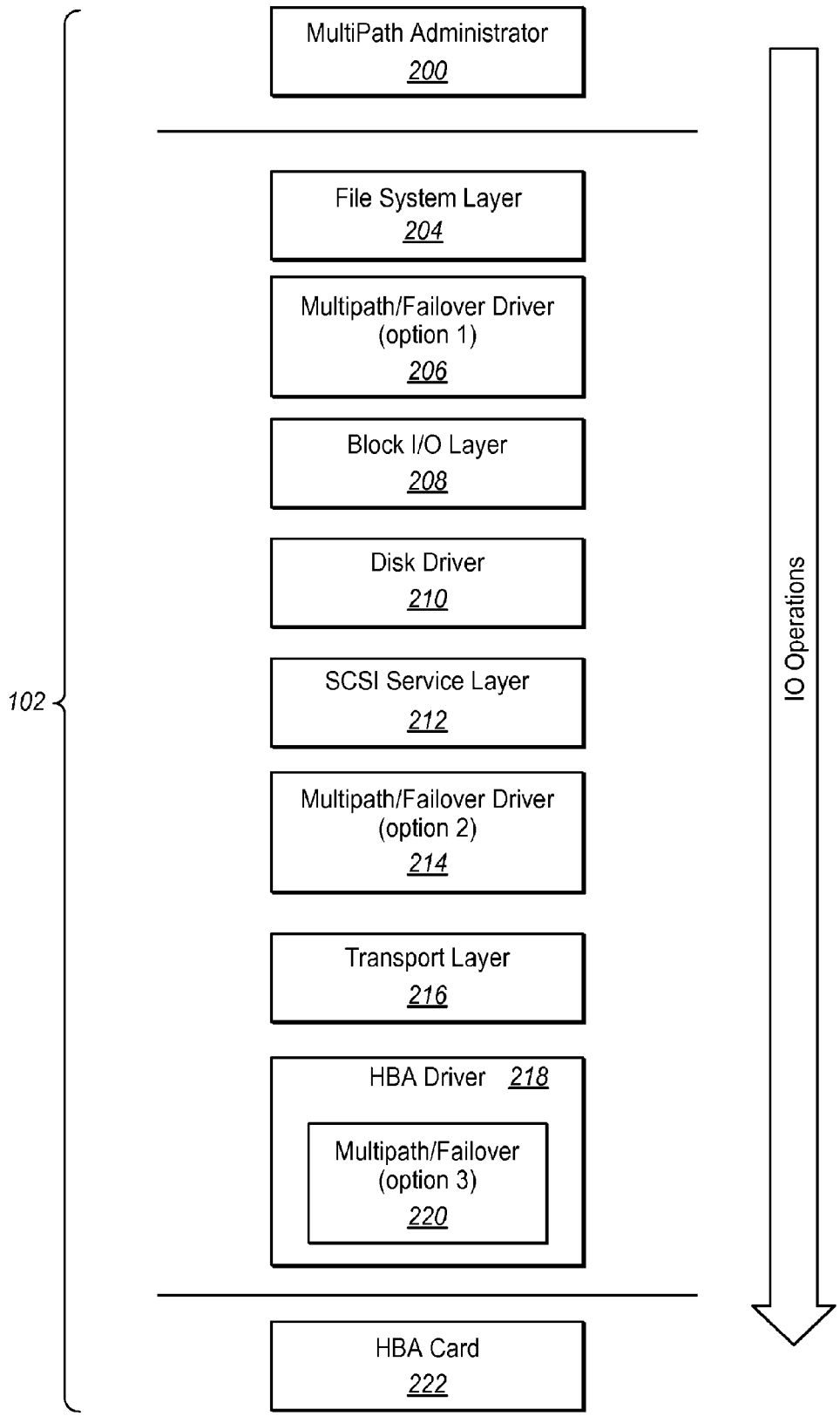
FIG. 2 is a block diagram depicting exemplary layering of multi-path related software in a computer system such as that of FIG. 1 and in accordance with features and aspects hereof.

FIG. 2 is a block diagram depicting and exemplary layering of software elements operable in a system such as computer system 102 a FIG. 1. Multi-path administrator 200 is a process operable in a user memory space. This administrator process 200 typically interacts with the operating system through a multi-path/failover driver element (206, 214, or 220) integrated within the layers of operating system storage interfacing. The operating system storage management typically includes a number of layers for interfacing with application programs. I/O operations are directed from a user application to the file system layer 204 and/or the block I/O layer 208. A typical file system layer 204 generally also interacts with block I/O layer 208. Block I/O layer 208, in turn, directs operations through disk driver 210. Disk driver 210, in turn, typically interacts with a SCSI service layer 212 to request lower level SCSI operations. The SCSI service layer 212 generally interacts with transport layer 216 which, in turn, interacts with the host bus adapter (HBA) driver 218. Driver 218 then prepares appropriate operations to be transferred to the HBA interface card 222. The host bus adapter card 222 then interacts with the storage system as appropriate for the particular physical layer of interaction for the particular communication media and protocol.

File system layer 204, blocked I/O layer 208, disk driver 210, SCSI service layer 212, transport layer 216, and HBA driver 218 generally operate within the kernel memory space of the operating system as trusted software components integrated within the operating system. The multi-path administrator typically operates in the less protected user memory space of the computer system.

In the context of a multi-path environment such as the LSI MPP architecture noted above, a multi-path/failover software element/driver operates within this kernel space. Such a multi-path/failover software element may be integrated optionally within any of the several layers of the operating system as is generally discussed in the LSI MPP architecture noted above. As shown in FIG. 2, the multi-path/failover software element may optionally be integrated with the operating system layers as element 206 to interact with the file system layer 204 and block I/O layer 208. In a second optional configuration the multi-path/failover software element 214 may be interact between the SCSI service layer 212 and the transport layer 216. In a third optional configuration, the multi-path/failover software element 220 may be integrated within the HBA driver 218.

In general, the multi-path administrator process 200 may interact with the multi-path/failover software element in any of these optional layer configurations to administer and configure the multi-path operation. In particular, in accordance with features and aspects hereof, the multi-path administrator process 200 interacts with the multi-path/failover software element at any of these optional layer configurations to determine the communication speed of each of the multiple paths between the computer system and the attached storage system.

Figure 3A:
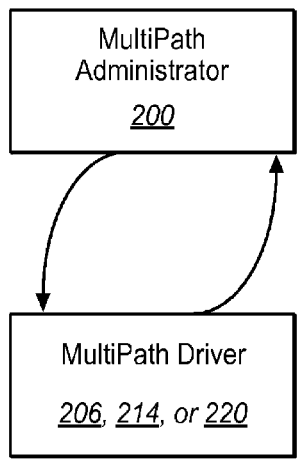
FIG. 3 is a block diagram representing exemplary exchanges to determine the transfer speed of each of multiple paths such as in the system of FIG. 1 and in accordance with features and aspects hereof.
Figure 3B:
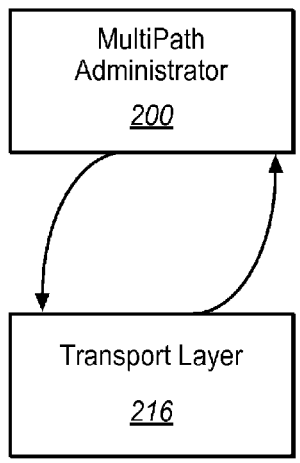
Figure 3C:
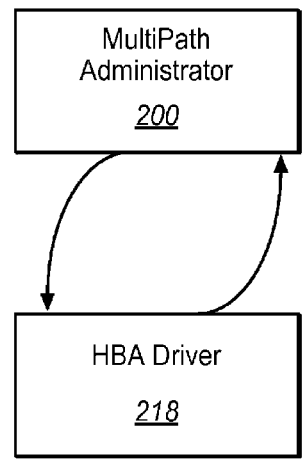
Figure 3D:
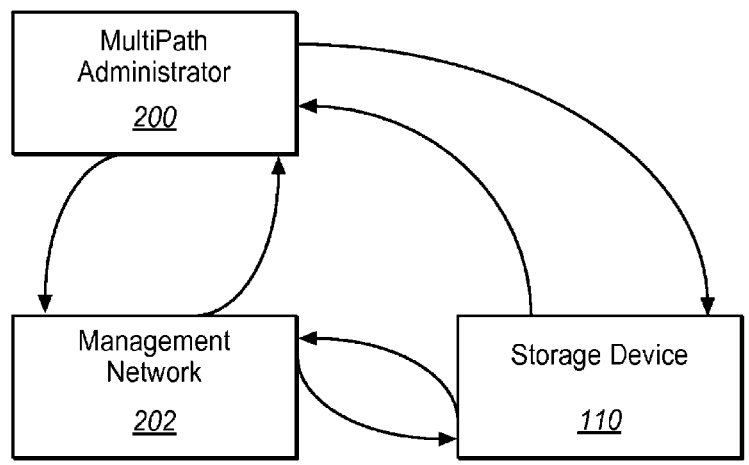

FIGS. 3A through 3D depict a number of alternative embodiments for a multi-path administrator process 200 to detect the transfer speed of each of a plurality of paths between the computer system and the storage system. FIG. 3A shows a first embodiment in which multi-path administrator process 200 communicates with the multi-path driver software element (206, 214, or 220) as optionally integrated within the various layers of operating system driver software for storage management. The multi-path driver element 206, 214, or 220 may dynamically obtain the transfer speed for a specified path (often referred to as an initiator-transfer nexus or I_T nexus) or may statically store the transfer speed of each path as previously configured by an administrator process. FIG. 3B suggests another alternate embodiment in which multi-path administrator process 200 interfaces with transport layer 216 to request that the transport layer 216 obtain and return the transfer speed of a designated path (a designated I_T nexus). FIG. 3C suggests yet another alternative embodiment in which multi-path administrator process 200 obtains the transfer speed of a designated path from the HBA driver 218. In yet another embodiment of FIG. 3D, the multi-path administrator process 200 may determine transfer speed of a path (an I_T nexus) using out of band communication techniques with a management network 302 (e.g., intelligent switches and routers within the network fabric coupling the computer system to the storage system). The management network 302 may then interact with the storage device 110 again utilizing out of band communication techniques to obtain the requested transfer speed and provide the determined speed to multitask administrator process 200. As yet another alternative depicted in FIG. 3D, multi-path administrator process 200 may interact directly with storage device 110 utilizing out of band communication techniques to obtain a requested transfer speed for a designated I_T nexus. Those of ordinary skill in the art will readily recognize numerous equivalent structures and techniques for dynamically determining or obtaining the transfer speed of each of the multiple paths coupling the computer system to the storage system and/or for statically configuring the transfer speed of each of the multiple paths.

Figure 4:
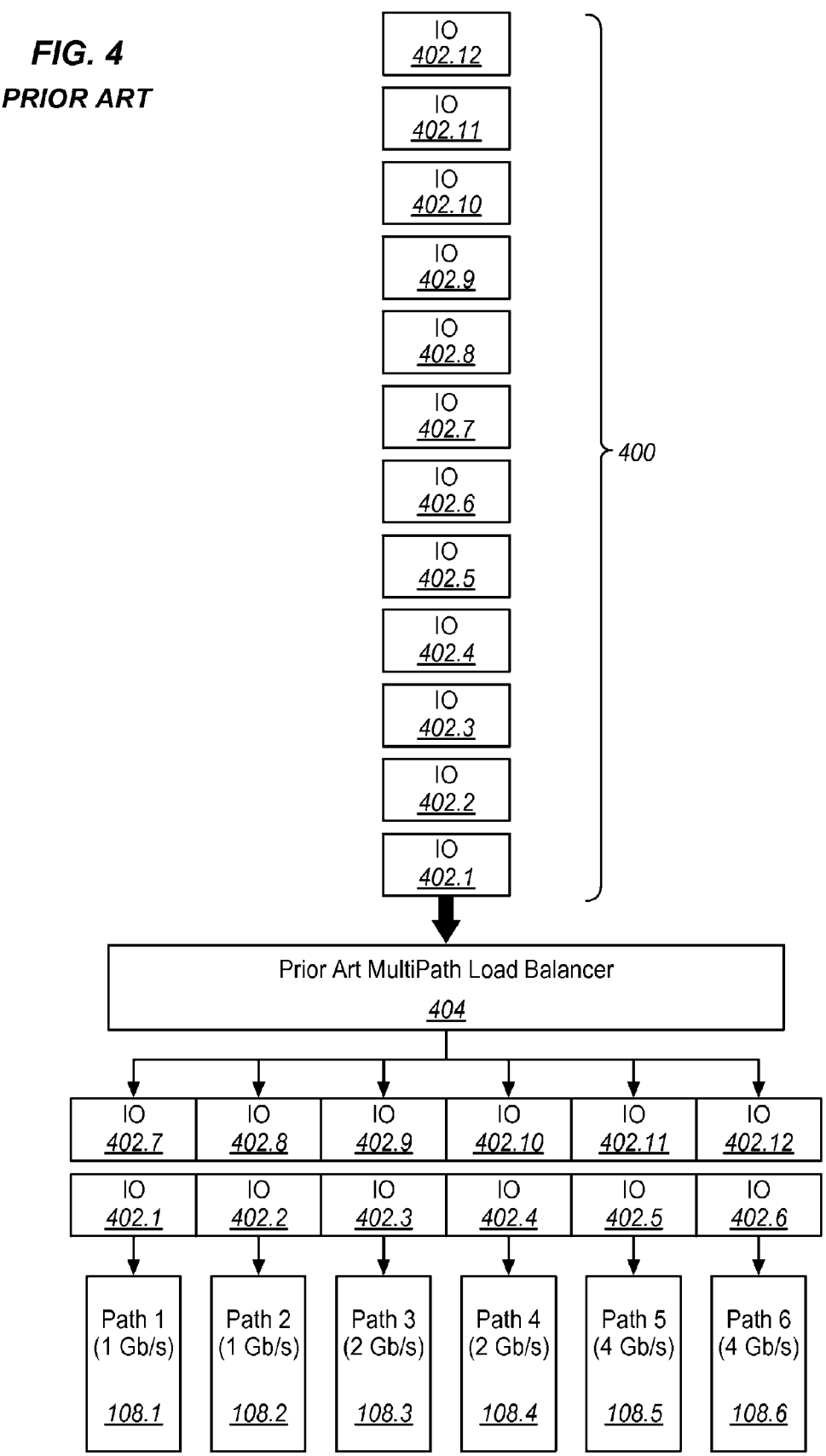
FIG. 4 shows load distribution of I/O operations in accordance with presently known techniques without consideration of transfer speed of the multiple communication paths.

In further explaining the operation of the multitask speed based load balancer of FIG. 1, it is useful to understand the load balancing techniques of previously known load balancing techniques as applied to multiple paths between a computing system and an attached storage system. FIG. 4 is a block diagram representing a large I/O request 400 broken into smaller I/O operations (402.1 . . . 402.12) to be distributed over multiple paths. Each of the smaller I/O operations 402.1 through 402.12 represents one portion of the larger audio request 400. Prior art multi-path load balancer 404 receives the sequence of I/O operations 402.1 through 402.12 in sequential order as shown and distributes the operations evenly to each of the multiple paths 108.1 through 108.6. Using a typical, well known, round robin load balancing technique, prior art load balancer 404 might distribute the I/O operations 402.1 through 402.12 as indicated by operations 402.1 through 402.12. In other words, each of the six exemplary communication paths 108.1 through 108.6 receives an equal number of the I/O operations of the larger I/O request. In particular, path 1 (108.1) may receive operations 402.1 and 402.7. Path 2 (108.2) may receive operations 402.2 and 402.8 and so on for each of the six available communication paths. As noted above, a problem arises with such simple load balancing distribution in that all requests will be slowed to the performance of the slowest communication paths (e.g., path 1 and path 2 each representing a slower 1 Gb per second communication path). Thus, prior load balancing techniques are sub-optimal as regards utilizing the aggregate communication bandwidth of the multiple communication paths.

Figure 5:
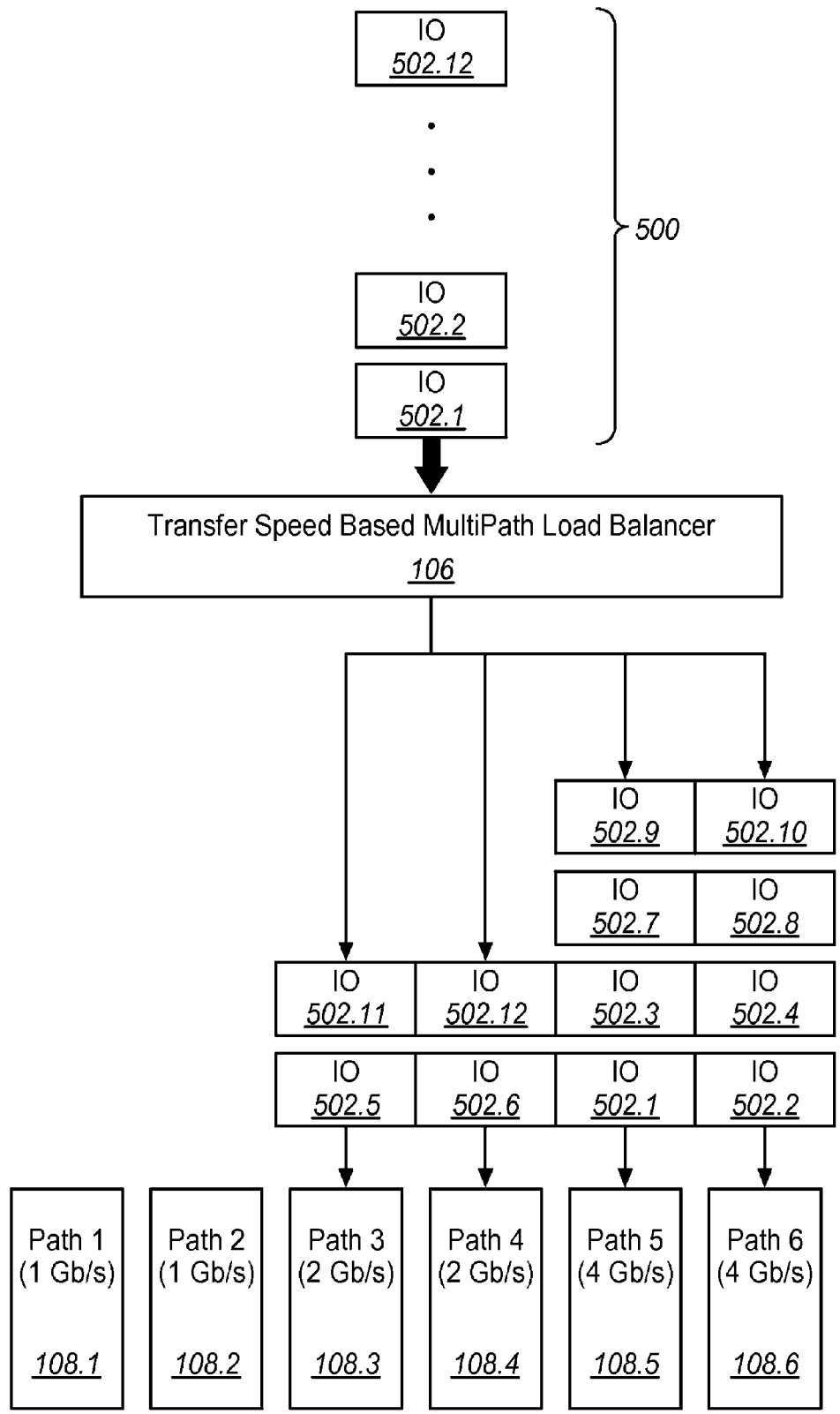
FIG. 5 exemplifies distribution of I/O operations between a computer system and a storage system in accordance with features and aspects hereof accounting for the transfer speed of each of the multiple communication paths.

By way of contrast, FIG. 5 is a block diagram exemplifying an improved load distribution in accordance with features and aspects hereof based on the transfer speed of the multiple communication paths between the computer system and the storage system. In one exemplary embodiment, the load is balanced by determining the estimated completion time for a next I/O operation based on the speed of each path and the volume of data presently queued to that path. Details of this and other techniques hereof are discussed further herein below. As generally depicted in FIG. 5, transfer speed based multi-path load balancer 106 (of FIG. 1) distributes operations 502.1 through 502.4 and 502.7 through 502.10 to paths 108.5 and 108.6 as providing the lowest estimated completion time for those operations and distributes portions 502.5, 502.6, 502.11, and 502.12 to the next fastest paths 108.3 and 108.4 when paths 108.5 and 108.6 have sufficient data queued such that paths 108.3 and 108.4 would have a lower estimated completion time. Details of this and other load balancing techniques in accordance with features and aspects hereof are discussed further herein below.

Figure 6:
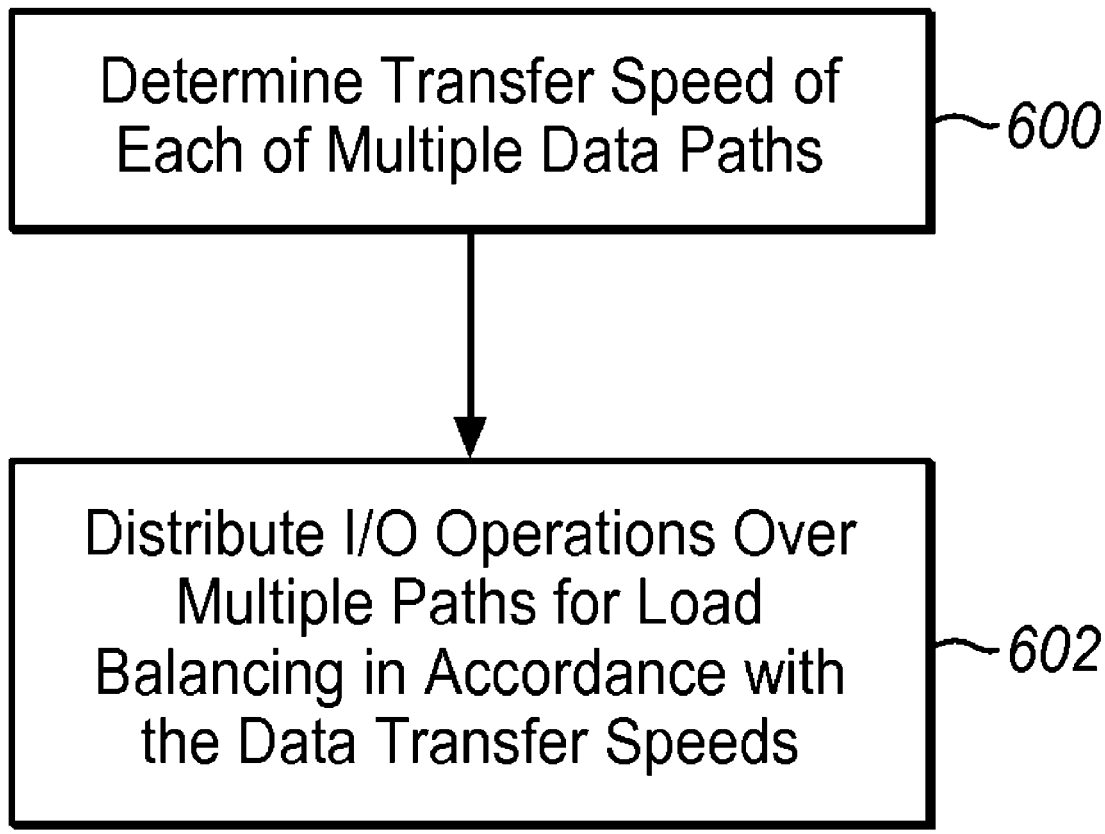
FIG. 6 is a flowchart describing a method in accordance with features and aspects hereof to distribute I/O operations over multiple communication paths based on the transfer speed of each of the paths.

FIG. 6 is a flowchart describing an exemplary method in accordance with features and aspects hereof for performing I/O operation distribution over multiple paths coupling a computer system to a storage system in accordance with the data transfer speeds of the multiple paths. Step 600 determines the transfer speed of each of the multiple communication paths. Based on the obtained transfer speed of each of the multiple data paths, step 602 distributes I/O operations between a computer system and the storage system over the multiple paths balancing the load across the multiple paths in accordance with the data transfer speed of each path. By so distributing the I/O operations based on the transfer speed of each of the multiple paths, the aggregate completion time of a plurality of such operations may be reduced as compared to prior techniques for load balancing that fail to account for transfer speeds of the multiple paths.

Figure 7:
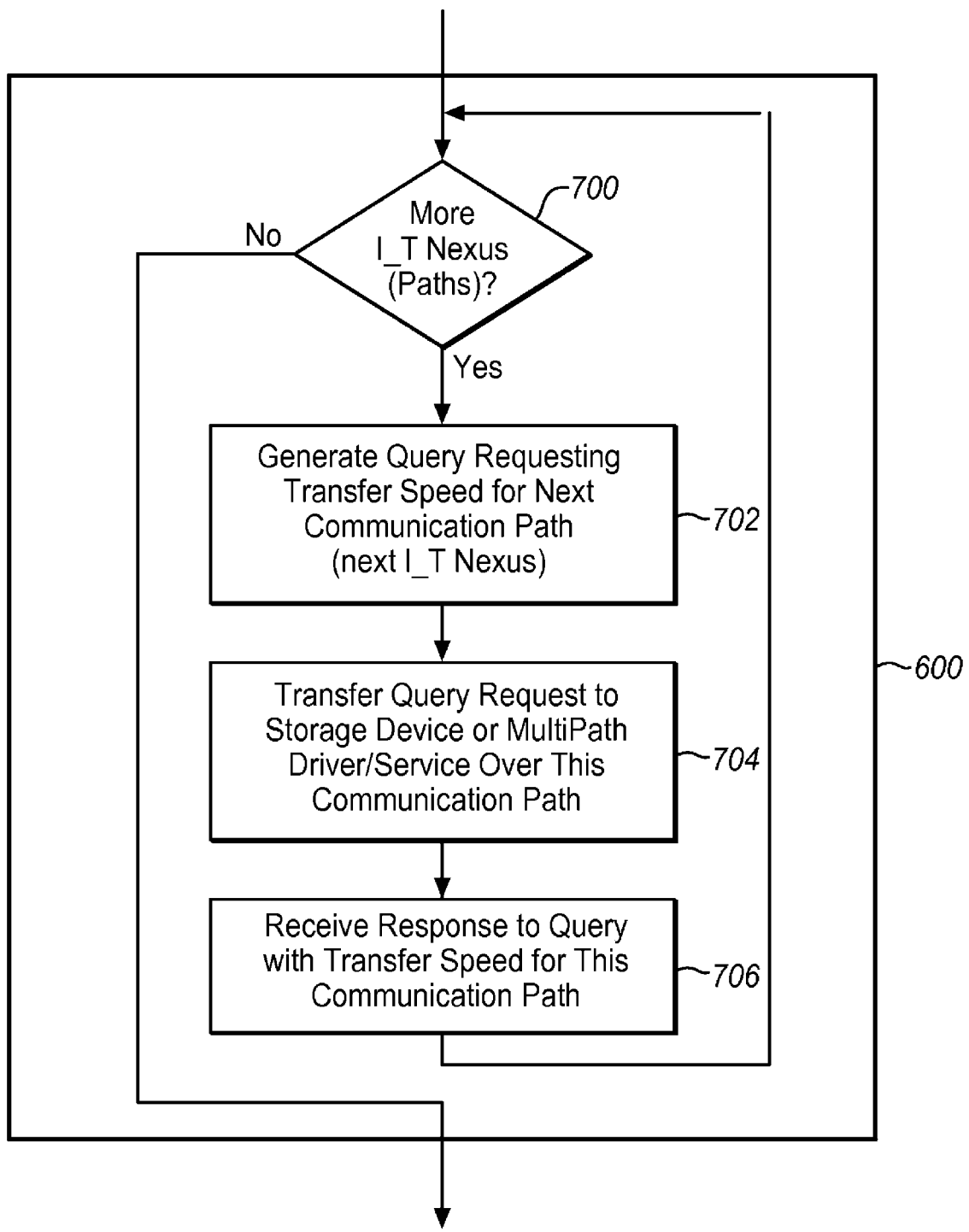
FIGS. 7-9 are flowcharts providing exemplary additional details of the processing of steps of the method of FIG. 6.

FIG. 7 is a flowchart providing exemplary additional details of the processing of step 600 of FIG. 6 to obtain transfer speeds for each of the multiple paths coupling a computer system to a storage system. Step 700 determines whether more I_T nexus (paths) remain to be evaluated for determining their respective transfer speed. If not, processing of step 600 is complete. Otherwise, steps 702 through 706 dynamically determine the transfer speed of the next I_T nexus to be evaluated. In particular, step 702 generates a query requesting the transfer speed of a next identified communication path (I_T nexus). The query request may be formatted, for example, as a SCSI Inquiry command requesting vendor specific Vital Product Data. Such a request is directed from the computer system to the storage system through appropriate operating system communication layers, drivers, and management services. In another embodiment, the query may be formatted as a SCSI Mode Sense command requesting vendor specific Mode Page information from the storage system. The response to such queries provides the transfer speed for the designated path. Step 704 transfers the formatted request to the storage device or to the appropriate multi-path driver or service layer of the operating system communication subsystem. Step 706 receives the response from the transferred query providing the transfer speed for the identified communication path (I_T nexus). Processing then continues looping back to step 700 to obtain the transfer speed of any remaining communication paths between the communicate computer system and storage system.

Figure 8:
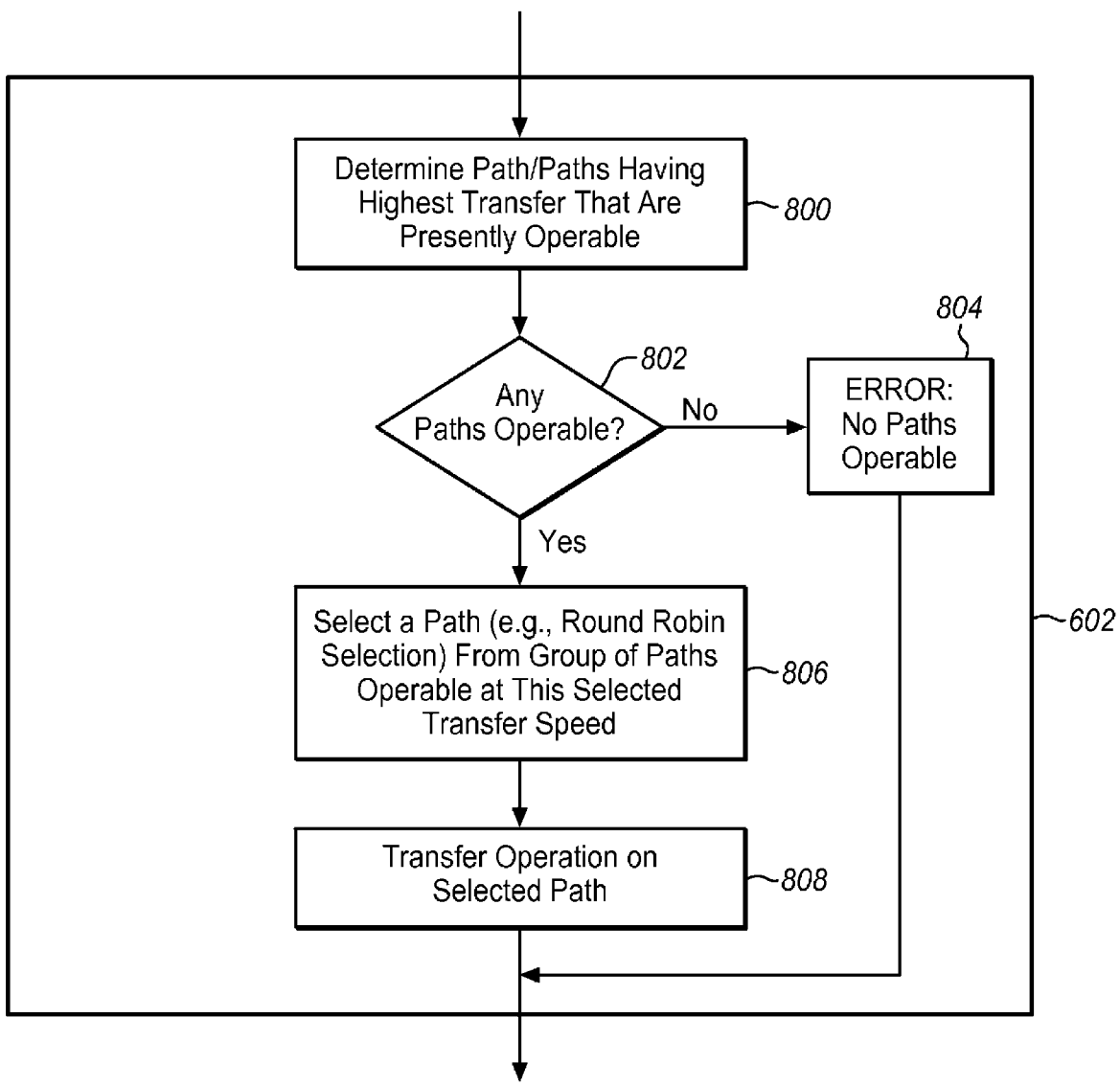

FIG. 8 is a flowchart providing exemplary additional details of the processing of step 602 of FIG. 6 to distribute I/O operations over the plurality of communication paths between the computer system and the storage system based on the transfer speed of each of the multiple communication paths. In the method of FIG. 8, the I/O operations are distributed in a round robin fashion to the communication path(s) that are presently available for use having the highest transfer speed. For example, if multiple communication paths are available providing 4 Gb per second transfer speeds and others paths are also available providing lesser transfer speeds, only the highest speed communication paths at 4 Gb per second will be utilized in the round robin fashion.

In particular, step 800 determines which path or paths have the highest transfer speed and are presently operable. In other words if the highest transfer speed paths are not presently operable and hence unavailable for transfer of the next I/O operation, the paths having next highest transfer speed are inspected to determine their availability and so on. Having thus identified the path or paths having the highest transfer speed that are presently operable, step 802 next determines whether any such path was found. If no paths are presently operable, step 804 completes the method by returning an error indication that no path is presently available or operable to perform the next I/O operation. If some path or paths are identified by step 800, step 806 next selects a path from the group of paths operable at the highest available transfer speed. In accordance with this exemplary embodiment, a round robin selection technique may be utilized but is limited to selecting from the group of paths having the highest transfer speed that is presently available. Step 808 then completes processing of this method by transferring the I/O operation on the selected path. The path selected by operation of step 806 and utilized by step 808 may be recorded in a suitable memory for use in the next invocation of the method of FIG. 8 so that the round robin selection technique may maintain a history of previously selected paths.

Figure 9:
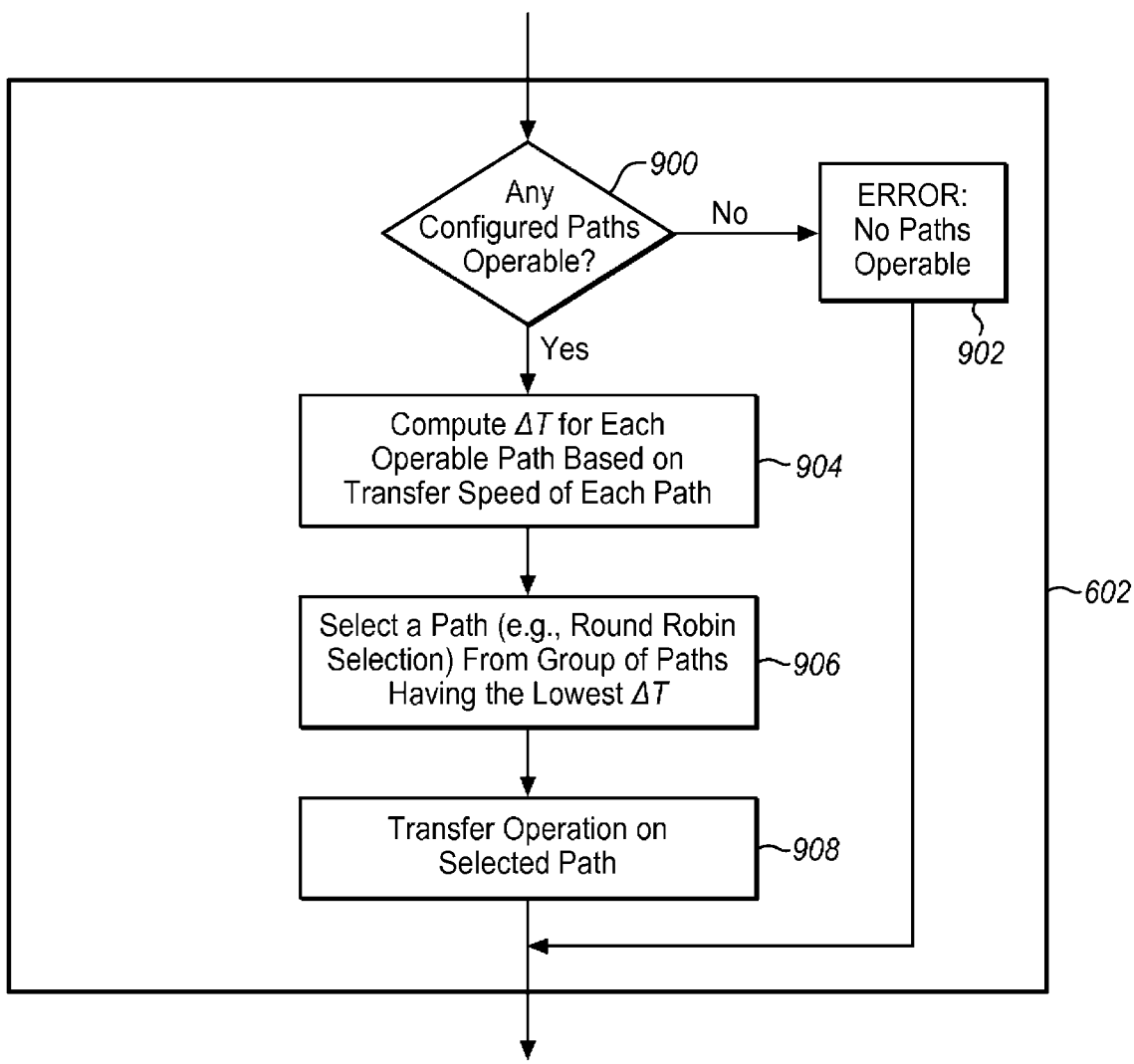

FIG. 9 is a flowchart describing another exemplary embodiment of additional details of the processing of step 602 of FIG. 6. In this embodiment, an estimated completion time ($\Delta T$) is computed for each operable path of the multiple paths between the computer system and storage system. The path having the lowest $\Delta T$ is then selected for transfer of the next I/O operation. In particular, step 900 determines whether any of the configured paths are presently operable. If not, step 902 completes processing of the method returning an error indication that no paths are presently operable for transfer of the I/O operation. Otherwise, step 904 computes the $\Delta T$ (estimated completion time) for the next I/O operation for each operable path based on the transfer speed of each path. In one embodiment, $\Delta T$ for each path is computed simply based on the transfer speed of each path. In another exemplary embodiment, the estimated completion time is computed based on the transfer speed of a path and the number of I/O operations previously queued for that path. Presuming that the each I/O operation is for a standard, predetermined size, the aggregate transfer time for all previously queued I/O operations may be determined. Step 906 than the selects a path from the group of paths having the lowest $\Delta T$ value. Where multiple paths have an identical, lowest $\Delta T$ value, a round robin or other selection process may be applied but limited to the group of paths having the lowest $\Delta T$. Since the $\Delta T$ computation is merely an approximation, $\Delta T$ values for one path may be considered equal/identical to that of another path if they are within a predetermined range of one another. Having so selected the path from the group of paths having the lowest $\Delta T$, step 908 then transfers the I/O operation on the selected path.

$\Delta T$ in the above method may be determined in accordance with numerous computations. In one exemplary embodiment, $\Delta T$ may be determined for path i as:

$$(n_{i_q}+n_{b_q})/r_i$$

where:
$n_{i_q}$ is the number of blocks presently queued to be transferred on path $P_i$,
$n_{b_q}$ is the number of blocks in the transfer for which completion time is being estimated, and
$r_i$ is the transfer speed of the path i.

In the above exemplary embodiment, the estimated completion time is based on the transfer speed of the path and the number of blocks to be transferred—both in the new transfer operation being considered for this path and the number already queued for the path under consideration. This computational method is suitable for high volume transfer operations such as stream oriented I/O and larger file I/O operations. This above computational method presumes that latency in transfers to the storage device are negligible In another exemplary embodiment, $\Delta T$ may be determined for path i as:

$$((n_i+1)\alpha/r_i)+(n_i+1)\beta$$

where:
$n_i$ is the number of requests presently queued to be transferred on path $P_i$,
$\alpha$ is the average length of a transfer to the storage system,
$r_i$ is the transfer speed of the path i, and
$\beta$ is the average latency of the storage system to transfer requested blocks to/from the storage devices of the storage system.

In the above exemplary embodiment, the estimated completion time is based on the transfer speed of a path under consideration but also incorporates measures of the latency that may be expected in transfers to or from the storage system. This computational method is well suited to applications with large volumes of small, unrelated I/O operations such as online transaction processing (OLTP).

Figure 10:
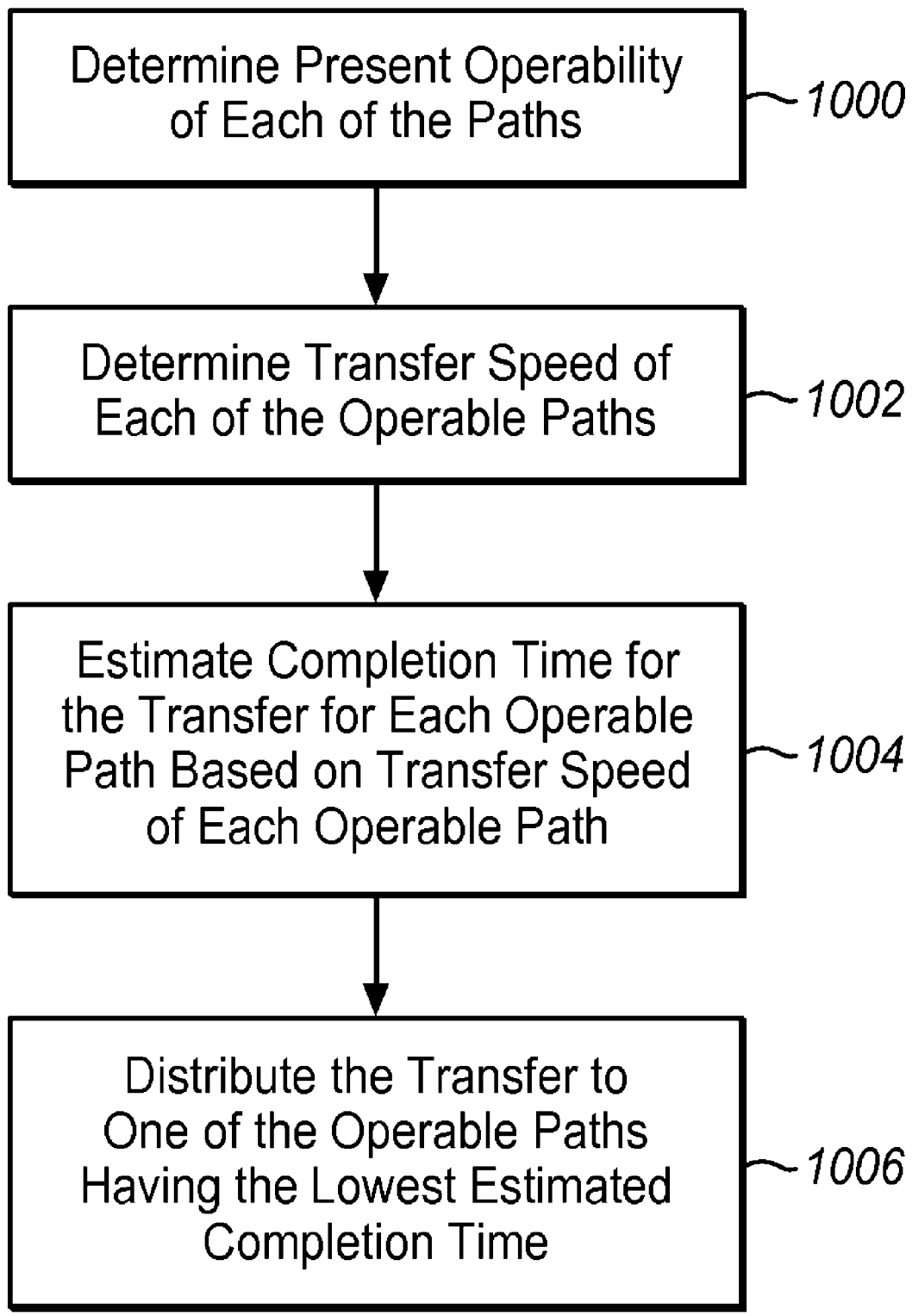
FIG. 10 is a flowchart describing another exemplary embodiment of a method in accordance with features and aspects hereof to distribute I/O operations over multiple paths between a computer system and a storage system based on transfer speed of each of the multiple paths.

FIG. 10 is a flowchart of another exemplary method in accordance with features and aspects hereof. Step 1000 determines the present operability of each of the multiple paths. As noted above, paths that are unavailable for any reason are excluded from consideration in the load balancing distribution of I/O operations. Step 1002 then determines the transfer speed of each of the operable paths identified by step 1000. Step 1004 then estimates completion time for the transfer of a next I/O operation on each of the operable paths based on the transfer speed of each operable path. As noted above, the estimated completion time ($\Delta T$) may be computed based solely on the transfer speed of each operable path and/or may be computed based on the transfer speed of each path in conjunction with the volume of data already queued on the corresponding path. Step 1006 then distributes a next I/O operation to one of the operable paths having the lowest estimated completion time. Again, as noted above, $\Delta T$ values for different paths may be considered equal if they fall within a predetermined range of one another.

Those of ordinary skill in the art will recognize numerous additional and/or equivalent method steps that may be incorporated in the methods of FIGS. 6-10. Thus, FIGS. 6-10 are intended merely as representative of various exemplary embodiments and represent all such equivalent and additional method steps. The additional and equivalent steps are omitted herein merely for brevity and simplicity of this discussion.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. In a system having a computer system coupled to a storage system through multiple communication paths where the communication paths have non-homogeneous data transfer speeds, a method for load balancing data transfer over the multiple communication paths between the computer system and the storage system, the method comprising:

determining the transfer speed of each communication path; and distributing exchanges between the computer system and the storage system over the multiple communication paths based on the transfer speed of each communication path, wherein the step of distributing further comprises:

determining an estimated completion time for an exchange for each of the multiple communication paths that are presently operable wherein the estimated completion time is determined as a function of the transfer speed of each path and as a function of a volume of data presently queued for transmission on each path; and distributing the exchange to the path having the lowest estimated completion time for the exchange.

2. The method of claim 1
wherein the step of determining further comprises:
querying from the computer system as an initiator device to the storage system as a target device wherein the query requests information from the storage system regarding the transfer speed of a particular communication path.

3. The method of claim 2
wherein the step of querying further comprises:
transmitting a SCSI Inquiry Command requesting a vendor specific Vital Product Data page from the computer system to the storage system wherein the Command is directed to a particular path between the computer system and the storage system; and
receiving the transfer speed of the particular path in the response to the Command.

4. The method of claim 2
wherein the step of querying further comprises:
transmitting a SCSI Mode Sense Command requesting a vendor specific mode page from the computer system to the storage system wherein the Command is directed to a particular path between the computer system and the storage system; and
receiving the transfer speed of the particular path in the response to the Command.

5. The method of claim 1
wherein the step of determining further comprises:
determining the transfer speed of each communication path within a multipath configuration application operable in the computer system.

6. The method of claim 1
wherein the step of determining further comprises:
determining the transfer speed of each communication path by communication exchanges out of band with respect to the communication path.

7. The method of claim 1
wherein the step of distributing further comprises:
distributing exchanges among paths of the multiple communication paths having the highest transfer speed of the multiple communication paths that are presently operable.

8. The method of claim 1
wherein the step of determining the estimated completion time further comprises:
determining the estimated completion time for the exchange as a function of the transfer speed of each path and of a latency time for the storage system.

9. A system comprising:

a storage system adapted for storing data and adapted for retrieving previously stored data in response to received requests;

a computing system adapted to generate requests to be transmitted to the storage system; and a plurality of communication paths coupling the computer system to the storage system wherein each communication path has a data transfer speed associated therewith and wherein the data transfer speeds of the plurality of communication paths is non-homogenous, wherein the computer system is adapted to determine the data transfer speed of each data communication path, wherein the computer system is further adapted to distribute the generated requests over the plurality of data communication paths as a function of the data transfer speed of each path, wherein the computer system is further adapted to determine an estimated completion time for an exchange for each of the plurality of communication paths that are presently operable wherein the estimated completion time is determined as a function of the transfer speed of each path and as a function of a volume of data presently queued for transmission on each path, and wherein the computer system is further adapted to distribute the exchange to the path having the lowest estimated completion time for the exchange.

10. The system of claim 9
wherein the computer system is further adapted to distribute exchanges among paths of the plurality of communication paths having the highest transfer speed of the presently operable paths of the plurality of communication paths.

11. The system of claim 9
wherein the computer system is further adapted to determine the estimated completion time for the exchange as a function of the transfer speed of each path and of a latency time for the storage system.

12. A method operable in a computer system coupled to a storage system through multiple communication paths ($P_i$ where i=1 ... n) where the communication paths have non-homogeneous data transfer speeds ($r_i$), the method for load balancing transmissions over the multiple communication paths from the computer system to the storage system, the method comprising:

determining the present operability of each of the plurality of communication paths;

determining the transfer speed ($r_i$) of each presently operable communication path;

estimating the completion time ($\Delta T_i$) for a transfer for each presently operable communication path $P_i$ based on the transfer speed thereof $r_i$ and based on a volume of data presently queued for transmission for each presently operable communication path $P_i$; and distributing the transfer to one of the multiple communication paths having the lowest estimated completion time.

13. The method of claim 12 wherein the step of estimating further comprises:

estimating the completion time for the transfer based on the transfer speed of only those presently operable paths having the highest transfer speed.

14. The method of claim 12 wherein the step of estimating further comprises:

estimating the completion time $\Delta T_i$ for the transfer on path $P_i$ as:

$$(n_{iq}+n_{bq})/r_i$$

where:

$n_{iq}$ is the number of blocks presently queued to be transferred on path $P_i$, and $n_{bq}$ is the number of blocks in the transfer for which completion time is being estimated.

15. The method of claim 12 wherein the step of estimating further comprises:

estimating the completion time $\Delta T_i$ for the transfer on path $P_i$ as:

$$((n_i+1)\alpha/r_i)+(n_i+1)\beta$$

where:

$n_i$ is the number of requests presently queued to be transferred on path $P_i$, $\alpha$ is the average length of a transfer to the storage system, and $\beta$ is the average latency of the storage system to transfer requested blocks to/from the storage devices of the storage system.

* * * * *